United States Patent [19]

Violett

[11] Patent Number: 5,601,159
[45] Date of Patent: Feb. 11, 1997

[54] BRAKE ASSEMBLY FOR MODEL VEHICLES AND METHOD

[76] Inventor: Robert S. Violett, 170 State Road 419, Winter Springs, Fla. 32708

[21] Appl. No.: 275,832

[22] Filed: Jul. 15, 1994

[51] Int. Cl.⁶ .................................................... B65H 59/10
[52] U.S. Cl. ........................... 188/67; 188/365; 192/88 B
[58] Field of Search .............................. 188/67, 366, 130, 188/19, 20, 74, 78, 151 R, 152, 365; 192/58 R, 57, 85 R, 88 B

[56] References Cited

U.S. PATENT DOCUMENTS

| | | | |
|---|---|---|---|
| 2,093,281 | 9/1937 | Kreuser | 192/88 B |
| 2,287,969 | 6/1942 | Brown | 188/152 |
| 2,457,344 | 12/1948 | Butler | 188/152 |
| 2,466,917 | 4/1949 | Stewart | 188/106 |
| 3,180,468 | 4/1965 | Sidles et al. | 192/88 |
| 3,386,535 | 6/1968 | Bishop et al. | 188/77 |
| 3,804,221 | 4/1974 | Valantin | 192/88 B |
| 4,188,142 | 2/1980 | Olsson | 192/88 B |
| 4,428,737 | 1/1984 | Schwenzfeier | 192/88 B |
| 4,447,016 | 5/1984 | Enberg | 192/88 B |

OTHER PUBLICATIONS

*Jet International,* Summer 1993, *Stopping* . . . Article.

Primary Examiner—Robert J. Oberleitner
Assistant Examiner—Clifford T. Bartz
Attorney, Agent, or Firm—Allen, Dyer, Doppelt, Franjola & Milbrath, P.A.

[57] ABSTRACT

A brake assembly and method are provided wherein a shaft having a bore rotates about a rod such that a flexible ring member positioned within a groove of the rod expands into frictional contact with the shaft bore wall for restricting rotation of the shaft when pressure is increased in a chamber formed between the flexible ring member and a bottom portion of the groove. The brake assembly for use with a model vehicle incorporates an onboard air pressure tank which suppplies pressure to the chamber forcing the O-ring into frictional contact with a rotating hub for bringing the rotating hub to a stop. A pressure regulator valve having both high and low pressure sources provides multiple pressure levels to the chamber for imparting varying frictional forces to the rotating hub for taking the vehicle through a controlled slowing and stopping action.

16 Claims, 4 Drawing Sheets

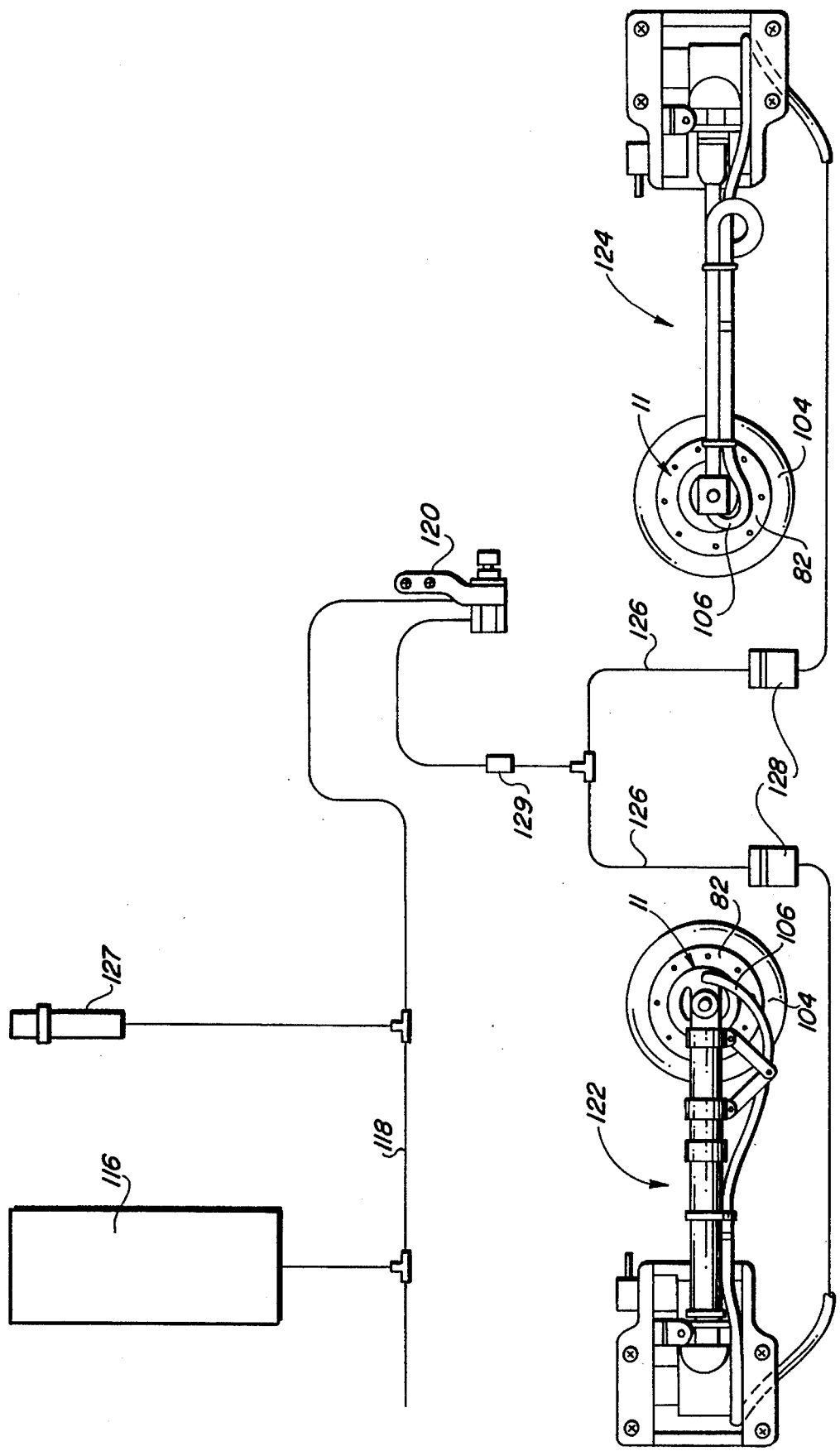

BRAKE ASSEMBLY FOR MODEL VEHICLES AND METHOD

BACKGROUND OF THE INVENTION

1. Field of the Invention

The present invention relates to a brake assembly, and more particularly to an improved brake arrangement and method suitable for use on the wheels of model vehicles such as heavy model aircraft and automobiles.

2. Description of Background Art

Well known to the art of braking is a class of brake generally referred to as hydraulic brakes, in that the actuating mechanism is operated by a hydraulic fluid pressure. As disclosed in U.S. Pat. No. 2,466,917 issued on Apr. 12, 1949 to E. Stewart, in brakes of this type it is necessary that the brake blocks be forced against the brake drum with enough force to stop the rotation of the drum which is usually mounted on the wheel of a vehicle, within a predetermined time and with a minimum of lag between the actuation of the brake pedal and the application of the braking force of the brake block on the brake drum. This is accomplished by some sort of an actuator or mechanism for transforming hydraulic pressure into mechanical thrust on the brake blocks. This hydraulic brake is employed for dynamic braking, that is, slowing up a rotating wheel and bringing a wheel to rest. In the brake system of U.S. Pat. No. 2,287,969 issued to R. W. Brown on Jun. 30, 1942, a tubular member is distended or expanded by the force of fluid therein, increasing the size or diameter of the member and forming a chamber therein. This expansion of the tubular annulus forces friction elements into engagement with a friction drum, so that the rotation of the drum is retarded, the torque being resisted through pins which are interlocked with pans and carried by a torque member. Brown '969 states that when landing a large and heavy ship, such as a transport airplane or a military bombing plane, a field of considerable size is required unless means is provided for bringing the heavy ship to a relatively quick stop after it is grounded. Because of the weight of such ships, conventional brake systems are inadequate to arrest the speed in a sufficiently short time to permit the planes to land on small field with safety. To accomplish such a feat, the Brown '969 invention includes a multiplicity of brakes, all operated in unison provided for each wheel so that even the largest ships when so equipped can be quickly brought to rest after landing. Further, Brown suggests that when taxiing the plane on the ground and otherwise controlling its ground movements, the severe braking action afforded by a multiplicity of brakes may be undesirable.

U.S. Pat. No. 3,180,468 issued on Apr. 27, 1965 to J. Sidles et al. discloses a brake mechanism using an expander tube brake. As stated, such brakes have been actuated by an endless annular rubber tube of oblong cross section, commonly called an "expander" tube, which is radially distensible by fluid pressure to press a series of brake shoes against a rotatable braking member such as a brake drum. Typically, an expander tube had been made as a fully closed tube except for a small fluid inlet pipe. Sidles '468 discloses a fluid distensible flexible actuating member formed in a general sheet configuration. Opposing sides of an annular brake shoe channel receive the annular actuating member and brake shoes. Portions of a frame ring form a bottom portion of the channel. The actuating member is then made in the form of a flat endless flexible ring, the circumference of which is slightly shorter than the circumference of the bottom of the brake shoe channel. The frame member further includes a nozzle which is rigidly fastened to a portion of the frame member in a hole which extends through a rib. A fluid actuating system is then adapted for connection to the interior of the actuating member through the nozzle so that the region of the actuating member between its marginal portion and two margins is communicated to a source of fluid pressure thus performing as a typical flexible fluid distensible actuating member for the brake system.

U.S. Pat. No. 2,457,344 issued to H. J. Butler on Dec. 28, 1948 discloses a fluid pressure brake apparatus having friction elements movable radially by distensible means relative to an annular support wherein the brake comprises members interposed between the distensible means and the friction elements. The interposed members have substantially flat portions on which the friction elements are mounted and web portions adapted to transmit pressure to the flat portions from the distensible means. Butler '344 discloses an embodiment applicable to an aircraft wheel comprising a series of separately formed members having a t-shaped cross section. The legs of the members constitute reinforcing webs located in radial slots provided in an annular support of a channel section. The support carries the distensible means in the form of a hollow rubber or metal annulus distensible by fluid under pressure and being attached to a torque disk secured to the permanent hub of the wheel. A spring ring capable of resilient extension circumferentially when the distensible element is inflated allows the series of t-shaped members and braking elements to be expanded radially outward into contact with the brake drum of the wheel, and further affects their withdrawal radially to their inoperative position on deflection of the distensible means.

The landing and ground controlling movements of the heavy aircraft described in the Brown '969 patent carry over to the landing, controlling and stopping of heavy model jet aircraft within the typical landing distances available to the model aircraft pilot. Typical methods of stopping such an aircraft include wheel brakes, spoilers, reverse thrust and drag shoots. Wheel brakes are typical for road vehicles as well as aircraft and depend on their efficiency for converting kinetic energy into heat then dissipating that heat. As described in an article entitled "Stopping," published Summer 1993, in Radio Control Jet International Magazine, and as is well known in the art of heavy aircraft modeling, with aircraft, wheel brakes usually have maximum weight-to-speed constraints. Such constraints show the maximum speed at which the brakes can be squeezed fully on without danger of them burning out and fading away to nothing. Typically they are hydraulically operated and can be put on with sufficient force to lock a wheel if the runway surface is wet. Thus, they are usually protected by anti-skid mechanisms similar to those in modern cars. Problems typically encountered with model aircraft brakes include finding sufficient force to operate them and having enough brake pad area to be able to stop a relatively heavy and fast landing model.

Well known in the art are cable and push rod systems as well as pneumatic control systems. Cable push rod systems employ a cable operated drum and shoe brake typically worked by a cam pulled by the cable when full up-elevator is applied. In a similar way, pneumatics are used to drive the wheel brakes. In addition to wheel brakes, contact brakes are used wherein fitted brakes in the form of pads are squeezed down into the wheel tires. Such contact brakes worked well enough to keep the taxiing speed down to sensible levels but they were not effective enough for stopping on the landing run available. Additionally, wet tires created even more of a problem.

SUMMARY OF THE INVENTION

The present invention is directed to a brake comprising a shaft having a bore extending through at least a portion of the shaft along a rotation axis. The bore is defined by an inner surface of the shaft. A cylindrical rod having an outer surface is dimensioned to loosely fit within the bore for rotating the shaft about the rotation axis. The rotation axis is coaxial with a cylindrical rod rotation axis. Further, the rod has a continuous groove within an outer surface about a perimeter of the rod. The groove is dimensioned for receiving a flexible ring member and is defined by a bottom wall and side walls. A flexible ring member having side surfaces in contact with the groove side walls forms a chamber with the bottom wall. An outside surface of the ring member forms a gap with a shaft inner surface in a first position wherein the shaft freely rotates about the shaft's rotation axis. The shaft inner surface rotates over the rod outer surface in this first position. Means for increasing pressure within the chamber sufficient for expanding the ring member to a second position wherein the ring member outside surface makes frictional contact with the shaft inside surface is provided. The frictional contact provides sufficient frictional force for restricting rotation of the shaft about the rod.

In a preferred embodiment of the invention, the pressure means comprises a compressed air source communicating with the chamber through a conduit means. A control valve communicates with the conduit means for controlling an amount of pressure delivered to the chamber.

In a preferred embodiment of a wheel brake assembly, an axle member has an axis of rotation and a cylindrical perimeter portion. The perimeter portion has a groove extending around the portion. The groove is defined by a bottom wall and side walls dimensioned for receiving a flexible ring member. A flexible ring member is placed within the groove to extend around the perimeter. The flexible member has sides in contact with the groove side walls for forming a seal at the groove side walls. The flexible member and the groove bottom wall form a sealed chamber with portions of the side walls. A rotatable hub having an interior surface portion defined by a cylindrical bore is dimensioned for rotatably receiving the axle member perimeter portion. Means are provided for increasing pressure within the chamber for expanding the flexible ring member from a first position wherein an outside surface of the ring member is distant the hub interior surface portion to a second position wherein frictional contact is made between the ring member surface and the hub interior surface portion. The frictional contact is sufficient for limiting hub rotation.

In this preferred embodiment, a solid rubber O-ring is used for the flexible ring member. Further, the pressure means comprises means for providing regulated air pressure to the chamber. The air pressure provided is sufficient for increasing the pressure within the chamber to cause expansion of the O-ring against the hub interior surface portion for braking any rotation of the hub. A flanged wall pair is affixed to the hub perimeter for receiving a model vehicle tire. In use, the hub member is affixed to an axle of the vehicle for permitting the vehicle to roll over a desired surface.

It is an object of the invention to provide a brake for bringing a heavy model vehicle such as a model jet aircraft through a controlled slow down to a stop during landing of the aircraft. Further, it is an object to provide uniform braking so as to avoid side loads on wheels as is often seen in disk style brakes typically used in the art. It is further an object to provide such a brake with a minimum of moving parts when compared to prior art devices and to do so with a brake that it economical to manufacture. Further, it is an object of the invention to extend the realism of piloting a model aircraft to its control during ground handling conditions.

BRIEF DESCRIPTION OF THE DRAWINGS

A preferred embodiment of the invention as well as alternate embodiments are described by way of example with reference to the accompanying drawings in which:

FIG. 5 is a functional flow illustration of a brake system for a model aircraft.

DETAILED DESCRIPTION OF PREFERRED EMBODIMENT

Figure 1A:
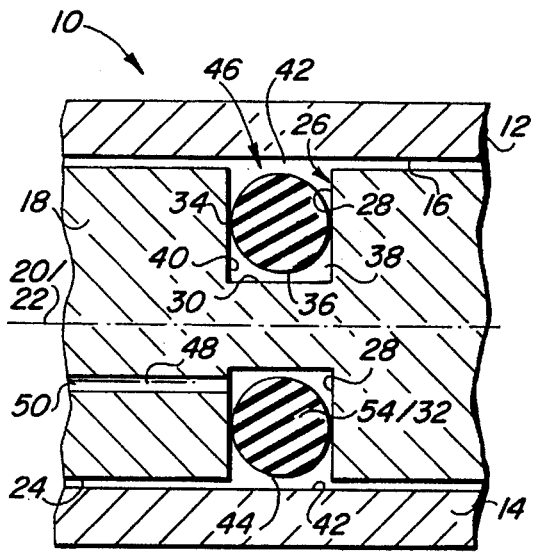
FIG. 1a is a partial cross sectional view of a brake of the present invention illustrating a ring member in a first position.
Figure 1B:
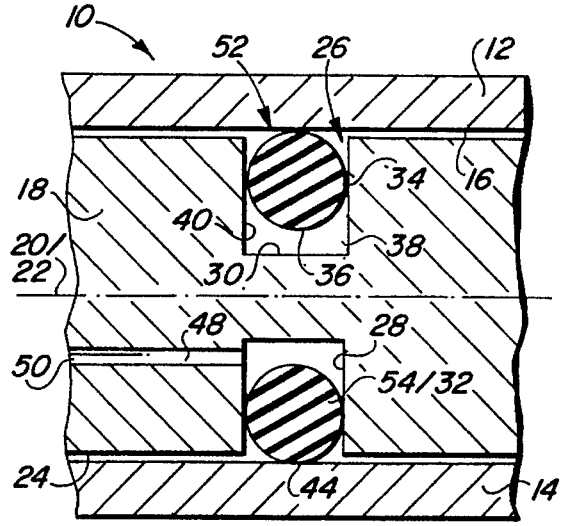
FIG. 1b is a partial cross sectional view of the brake of FIG. 1a illustrating the ring member in a second position for restricting rotation of a shaft.

With reference to FIGS. 1a and 1b, the brake 10 of the present invention comprises a shaft 12 having a bore 14 extending therethrough. The bore 14 is defined by a shaft inner surface 16 and is dimensioned to receive a cylindrical rod 18. The shaft 12 rotates about a rotation axis 20 coaxial with a cylindrical rod axis 22. The rod 18 has an outer surface dimensioned to loosely fit within the bore 14 for rotating the shaft 12 about the rotation axis 20. Further, the rod 18 has a continuous groove 26 within the rod outer surface 24 about a perimeter of the rod 18. The groove 26 is defined by side walls 28 and a bottom wall 30. A flexible ring 32 is placed within the groove 26. The flexible ring 32 communicates with the groove 26 such that side surfaces 34 of the ring member 32 are placed in sealable contact with the groove side walls 28. A ring member inner surface 36 forms a chamber 38 with a bottom portion 40 of the side walls 28 and the bottom wall 30. A gap 42 is formed between the shaft inner surface 16 and a ring member outside surface 44 in a ring member first position 46 as illustrated in FIG. 1a.

Again with reference to FIGS. 1a and 1b, the cylindrical rod 18 has a hole 48 passing from an outside surface location 50 of the rod 18 to the chamber 38. The chamber 38 communicates with a pressure source (not shown) for increasing pressure within the chamber 38. By increasing pressure within the chamber 38, the flexible ring member 32 expands due to pressure buildup within the chamber 38 thereby causing the gap 42 to be closed and the ring member outside surface 44 to come in frictional contact with the shaft inner surface 16. Pressure in the chamber 38 is increased sufficiently to expand the flexible member 32 and provide sufficient frictional contact with the shaft inner surface 16 for restricting rotation of the shaft 12 about the rod 18. With increased pressure in the chamber, the flexible ring member 32 expands to a second position 52 for restricting rotation of the shaft 12. In the preferred embodiment of the invention, an O-ring 54 well known in the art is used. The O-ring 54 is selected to have a rubber material sufficiently flexible to be expanded from the first position 46 to the second position 52 by the compressed air source. For systems using the brake described later in the specification, it will be seen that typical compressed air sources have pressures of approximately 100 psi.

Figure 2A:
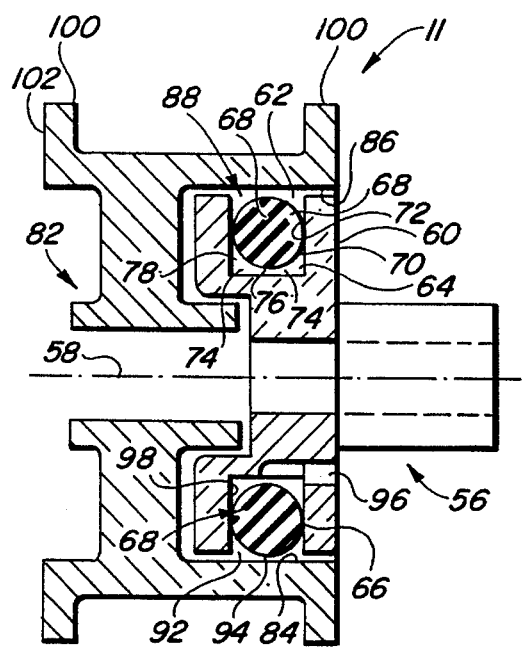
FIG. 2a is a partial cross sectional view of a wheel hub and brake assembly of a preferred embodiment of the present invention.
Figure 2B:
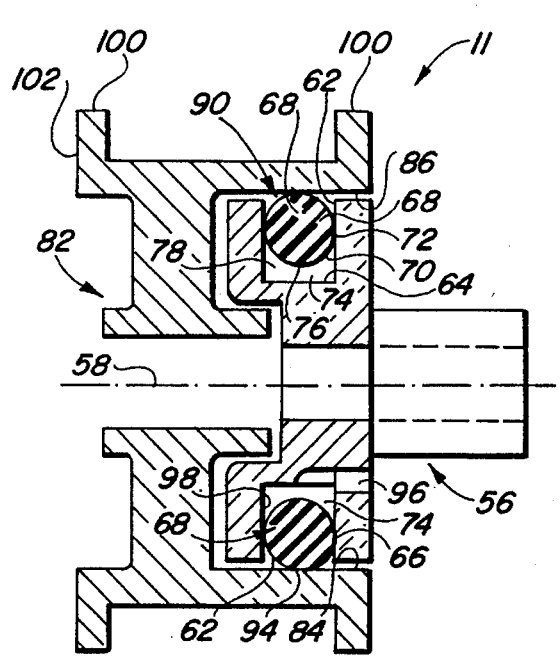
FIG. 2b is a partial cross sectional view of the embodiment of FIG. 2a illustrating an O-ring in an extended second position for restricting rotation of a hub.

As discussed earlier, wheels and brakes sufficient to control model jet airplanes gives a new dimension of control resulting in good ground handling. The preferred embodiment of the present invention as illustrated with reference to FIGS. 2a and 2b is a wheel brake assembly 11 comprising an axle member 56 having an axis of rotation 58 and a cylindrical perimeter portion 60 wherein a channel or groove 62 extends around the portion 60. The groove 62 is defined by a bottom wall 64 and side walls 66 dimensioned for receiving an O-ring 68. As described earlier, the O-ring 68 is dimensioned for extending around the perimeter 60. The O-ring has sides 70 sufficiently flexible and dimensioned for forming a seal with the groove side walls 72. The arrangement is such that a chamber 74 is formed by an inner surface 76 of the O-ring 68, a bottom portion 78 of side walls 72 and the bottom wall 64 of the groove 62. In this preferred embodiment of the invention, the axle member 56 is a nonrotatable member. A rotatable hub 82 has an interior surface portion 84 defined by a cylindrical bore 86 dimensioned for rotatably receiving the axle member perimeter portion 60.

As described earlier with reference to FIGS. 1a and 1b, FIGS. 2a and 2b illustrate the O-ring 68 in a first position 88 (FIG. 2a) wherein the hub 82 freely rotates about the axle member 56. The O-ring 68 forming a gap 92 between the hub interior surface portion 84 and an O-ring outside surface 94. As illustrated with reference to FIG. 2b, pressurizing the chamber 74 causes the O-ring 68 to be placed in the second position 90 wherein the O-ring outside surface 94 is in frictional contact with the hub interior surface portion. Pressure in the chamber 74 is increased to sufficient level wherein the O-ring 68 expands to provide sufficient frictional force between the O-ring outside surface 94 and the hub interior surface portion 84 to bring a rotating hub 82 to an eventual stop.

Figure 3:
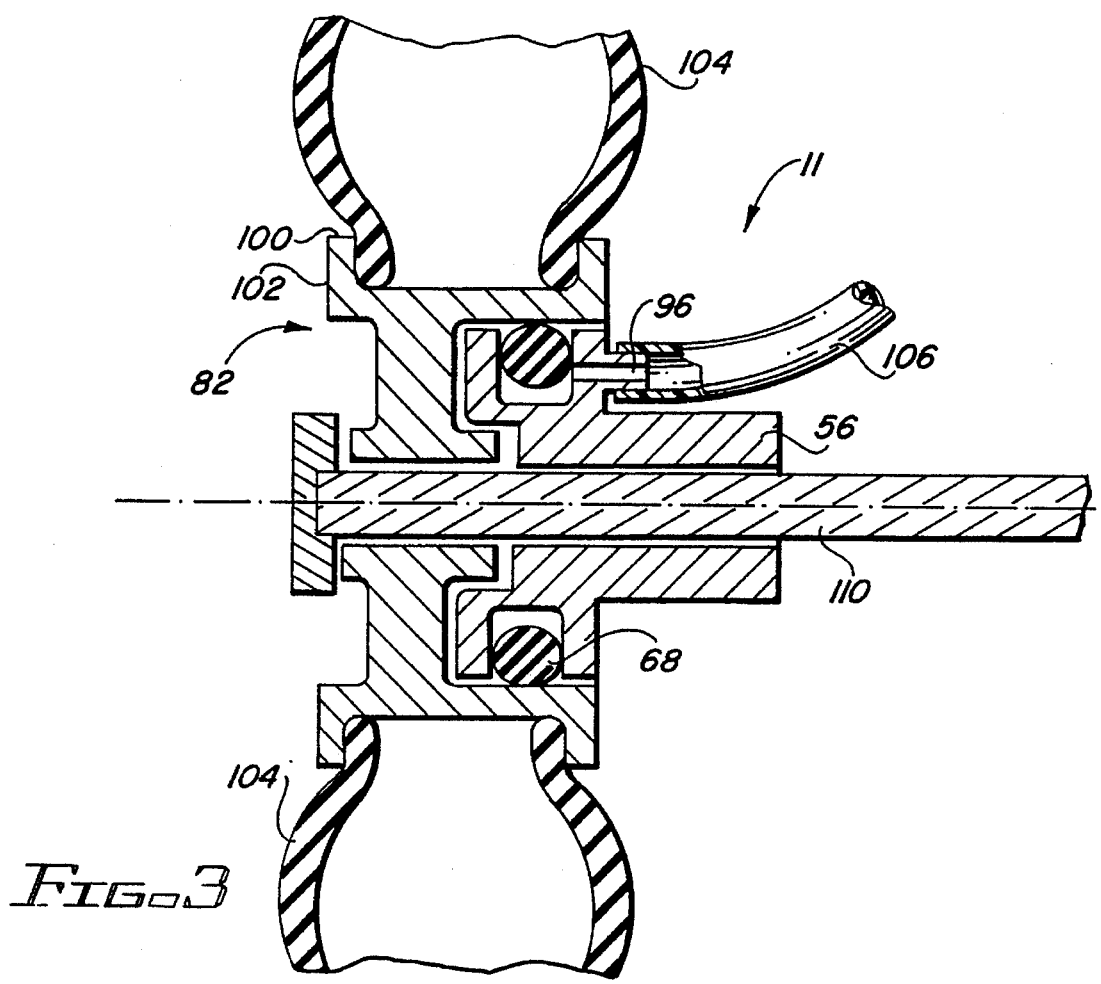
FIG. 3 is a partial cross sectional view of the wheel brake assembly of FIG. 2a further illustrating its use.

In the preferred embodiment of the wheel brake assembly 11, a hole 96 passes through a side wall portion 98 of the cylindrical perimeter wall portion 60 such that the hole 96 communicates with a portion of the chamber 74 proximate the bottom wall 80. Further, in the preferred embodiment of the brake assembly 11 and as illustrated in FIGS. 2a and 2b, a flanged wall pair 100 is affixed to a peripheral portion 102 of the hub 82. The wall pair 110 is dimensioned for receiving a model vehicle tire 104 within the flanged wall pair 100 as illustrated with reference to FIG. 3.

Again with reference to FIG. 3, the chamber 74 communicates to a pressure source (not shown) using a conduit 106 providing increased pressure to the chamber 74 through the hole 96. In the preferred embodiment of the invention, airlines typically used in model jet aircraft are used for the conduit 106 and a nipple 108 is used to affix the conduit 106 to the hole 96. As further illustrated with reference to FIG. 3, the axle member 56 is affixed to an axle 110 made apart of the model vehicle (not shown) employing the wheel brake assembly.

Figure 4:
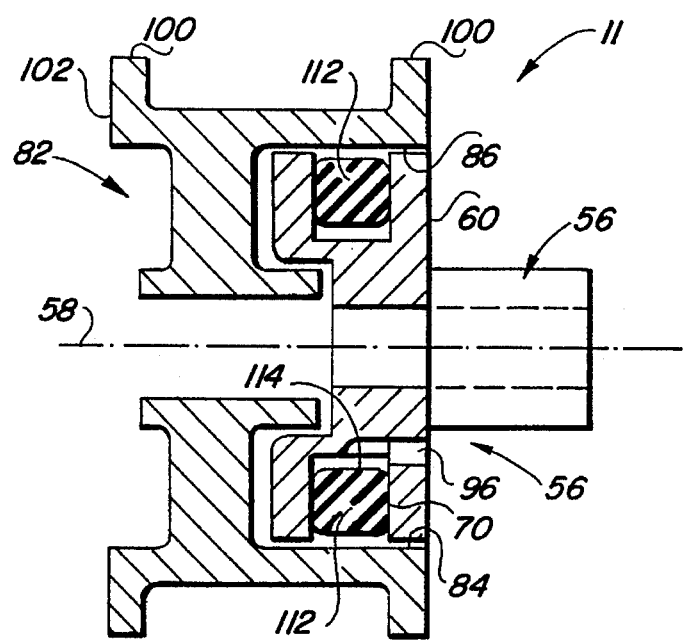
FIG. 4 is a partial cross sectional view of the embodiment of FIG. 2a illustrating the use of an O-ring having flat surface portions.

With reference to FIG. 4, alternate embodiments of the O-ring 68 include an O-ring 112 having a cross section including flat surfaces 114.

Commercial available "quad O-rings" provide such surfaces 114 and result in a larger surface contact of the O-ring surface 114 with groove side walls 72 as well as increase surface contact between the ring member outside surface 94 and the hub interior surface portion 84. The brake assembly 11 of the present invention is used for model vehicles of varying sizes and wheel requirements. In a preferred embodiment used in smaller vehicles having smaller wheels, a standard O-ring 68 is provided with at least one flat surface 94 wherein the flat surface 114 is the O-ring outer surface 94 making frictional contact with the hub interior surface portion 84.

By way of example and with reference to FIG. 5, a braking system using the wheel brake assembly 11 of the present invention comprises an air pressure tank 116 containing air under pressure to about 100 to 110 psi. A first conduit portion 118 communicates with the tank 116 for delivering air under pressure through a control valve switch assembly 120. In the preferred embodiment of the present invention, the control valve switch assembly 120 is an air driven microswitch tripped by an elevator actuation or by a separate control channel in a remote control system (not shown). In a typical aircraft having two breaking wheel systems 122 and 124, a second conduit portion 126 delivers air under pressure to the chamber 74 described earlier. By way of example and with reference to FIG. 5, the braking wheel system 122 employs a scaled air strut while the braking wheel system of 124 illustrates an alternate wire strut system. For convenience, and by way of example, disconnects 128 are incorporated in the conduit second portion 126. To improve air flow through the system a restrictor valve 129 is incorporated within the system between the valve switch assembly 120 and the disconnects 128 as illustrated in FIG. 5. Further, as illustrated in FIG. 5, a fill valve 127 taps into the system between the switch 120 and the tank 116. The fill valve 127 provides convenience when charging the tank 116 and system.

Typically, the control valve switch 120 is set such that a normal down elevator used in flight will not actuate the brake system but a full down elevator will cause sufficient pressure in the chamber 74 to be delivered from the tank 116 at a high enough level to restrict rotation of the hub 82. By way of example, and again with reference to FIG. 5, the hub 82 and axle member 56 illustrated are as described earlier and illustrated with reference to FIGS. 2a and 2b.

Typically, air powered brake systems use a non-proportional control, that is they are either in an off position (the first position 88) or in an on position (the second position 90). The amount of "on" varies with the pressure available. If one taps off a same air source as used for a retract system in the aircraft, there will be a substantial amount of pressure available in the beginning of a flight and somewhat less pressure available after aircraft gear and the brakes have been used. In an alternate embodiment, a second air storage tank (not shown) can be installed having a desired pressure sufficient to operate the brake assembly 11 thus providing a more constant braking pressure. The benefits of an auxiliary tank are traded against the added weight provided by the tank, the need for additional space, and the additional plumbing complexity required by the addition of such auxiliary equipment in general. In using the single air pressure tank 116 as the source of pressurized air, one piloting technique used in controlling the brake assembly 11 is to pulse the assembly 11 by switching the control valve 120 from an on to an off position in a generally rapid succession. This simple pulsing of the brake assembly 11 has yielded satisfactory results in the landing and controlling of the aircraft when bringing it to a stop on even short runways. As well known by the model pilot, such short runways frequently operate from 300 feet to 400 feet. The brake assembly 11 described herein has been seen to provide additional enjoyment, realism, and safety for the model aircraft.

Figure 6A:
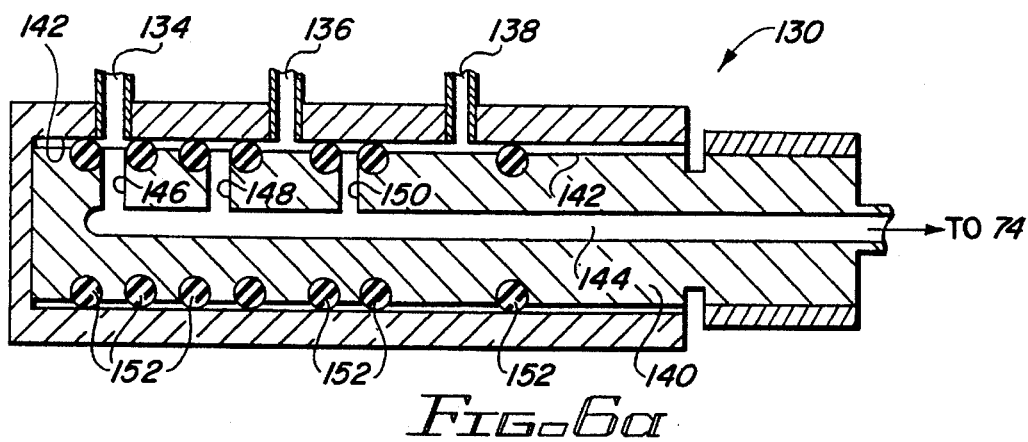
FIGS. 6a through 6c are partial cross sectional views of a pressure regulator valve in first, second and third positions.
Figure 6B:
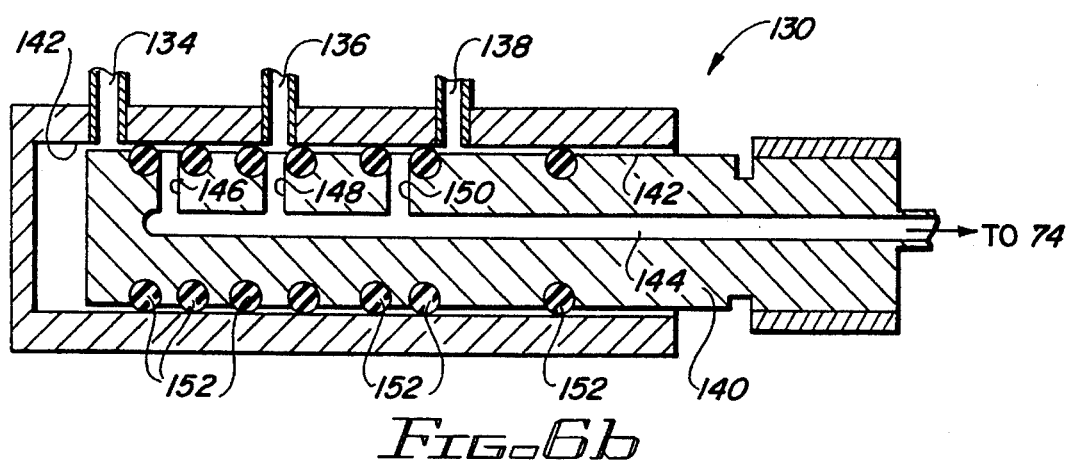
Figure 6C:
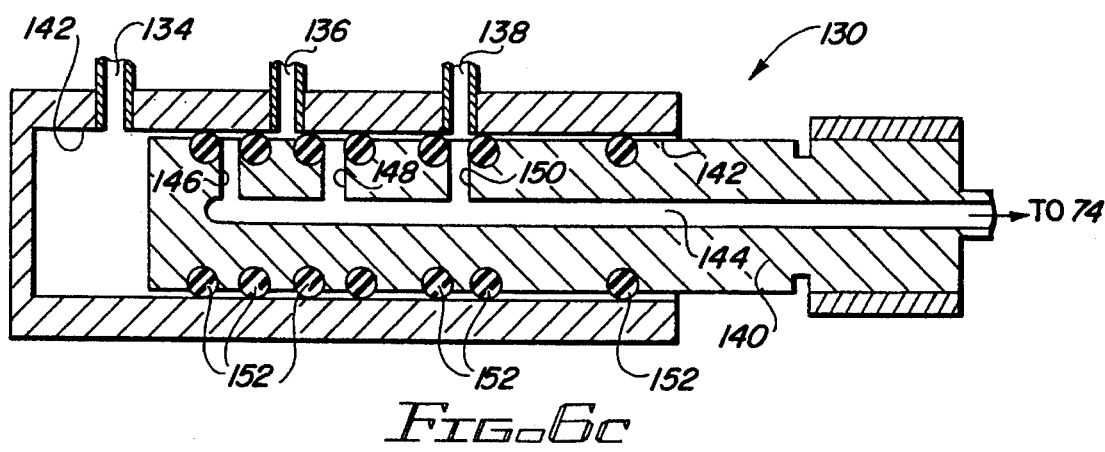

With reference to FIGS. 6a through 6c, using an alternate air pressure tank (not shown) as well as the tank 116 provides the additional benefit as described earlier as well as further control of the brake assembly 11 when used in combination with a pressure source regulator valve 130 illustrated in FIGS. 6a through 6c. The regulator valve 130 comprises a valve housing 132. The valve housing has an exhaust port 134, a low pressure port 136, and a high pressure port 138 by way of example. A slide member 140 is dimensioned to closely fit within a bore 142 of the valve housing 132. The slide member 140 comprises a pressure line 144 having first, second and third inlet ports 146, 148 and 150, respectively, for individually communicating with the exhaust 134, low 136 and high 138 ports. The pressure line further has an outlet port 152 for communicating with the chamber 74 of the brake assembly 11. Further, by way of example, a high pressure tank (pressure tank 116) communicates with the high pressure port 138. A second low pressure tank (not shown) communicates with the low pressure port 136. As used in a typical system, the high pressure tank 116 contains air under pressure to about 100 psi while a low pressure tank contains air under pressure at approximately 40 psi. For the efficient flow of air through the ports 134, 136 and 138 into the pressure line 144 and to the chamber 74, seals 152 isolate the ports and provide smooth control of the slide member 140 during operation of the pressure regulator valve 130. In operation, and by way of example, the slide member 140 is position within the valve housing 132 such that the first inlet port 146 is aligned with the exhaust port 134 thus providing an ambient pressure within the chamber 74. Such a position for providing ambient pressure to the chamber 74 is as illustrated in FIG. 6a. During an initial stage of ground control for slowing down the aircraft, the slide member 140 is displaced so as to align the second inlet port 148 with the low pressure port 136 thereby providing approximately 40 psi pressure to the chamber 74. Such pressure, is sufficient to expand the O-ring 68 into frictional contact with the hub interior surface portion 84 but for the aircraft in this example, such frictional force is sufficient for slowing down the aircraft but not bringing it to an abrupt stop. Such an arrangement is as illustrated in FIG. 6b. To bring the aircraft to a stop using the pressure regulator valve 130, the slide member 140 is again displaced so as to align the third inlet port 150 with the high pressure port 138 thereby causing the pressure within the chamber 74 to increase to approximately 100 psi wherein such a pressure provides sufficient frictional force between the expanded O-ring 68 and the hub interior surface portion 84 thereby bringing the aircraft to a full stop.

While specific embodiments of the invention have been described in detail herein above, it is to be understood that various modifications may be made from the specific details described herein without departing from the spirit and scope of the invention as set forth in the appended claims.

Having now described the invention, the construction, the operation and use of preferred embodiments thereof, and the advantageous new and useful results obtained thereby, the new and useful constructions, methods of use and reasonable mechanical equivalence thereof obvious to those skilled in the art are set forth in these appended claims.

What is claimed is:

1. A brake comprising:

a shaft having a bore extending through at least a portion of the shaft along a rotation axis, the bore defined by an inner surface of the shaft;

a cylindrical rod having an outer surface, the rod dimensioned to loosely fit within the bore for rotating the shaft about the rotation axis, the axis coaxial with the cylindrical rod rotation axis, the rod having a continuous groove within the rod outer surface about a perimeter of the rod, the groove for receiving an O-ring, the groove having side walls and a bottom wall;

a flexible O-ring having side surfaces in contact with the groove side walls thereby forming a chamber with the bottom wall, an outside surface of the O-ring forming a gap with the shaft inner surface win a first position wherein the shaft freely rotates about the shaft rotation axis, the shaft inner surface rotating over the rod outer surface in the first position, the O-ring sufficiently flexible for expanding from the first position to a second position for making frictional contact with the shaft inside surface; and means for increasing pressure within the chamber sufficient for expanding the O-ring to a second position wherein the O-ring outside surface makes frictional contact with the shaft inside surface with sufficient frictional force for restricting rotation of the shaft about the rod.

2. The brake as recited in claim 1, wherein the pressure increasing means comprises:

a pressurized fluid source;

a conduit means for delivering the fluid from the source to the chamber; and a control valve communicating with the conduit means for controlling an amount of pressure delivered to the chamber.

3. The brake as recited in claim 2, wherein the pressurized fluid source comprises compressed air for delivery to the chamber thereby increasing chamber pressure.

4. A brake assembly useful with rolling model vehicles, the brake assembly comprising:

a wheel hub having an inner wall portion dimensioned for communicating with an axle member, the hub having an outside rim portion for receiving a model vehicle tire;

an axle member having parallel flange elements dimensioned to form a channel along a periphery for receiving a flexible O-ring, the channel having inside wall surfaces for sealably contacting O-ring side surfaces, the flange elements dimensioned to loosely rotate within the wheel hub inner wall, one flange having a hole passing therethrough, the hole proximate a bottom wall of the channel, the axle member having a bore for receiving an axle;

a flexible O-ring dimensioned to be received by the channel, the O-ring having side surfaces sealably contacting channel side wall surfaces and distanced from the channel bottom wall thereby forming a chamber with a bottom portion of the channel and an inside surface of the O-ring;

a conduit communicating with the chamber through the hole, the conduit further communicating with a regulated compressed air source, the compressed air source having air under sufficient pressure for increasing air pressure within the chamber for expanding the O-ring and thereby causing an outside surface of the O-ring to make frictional contact with the wheel hub inner wall portion with sufficient frictional force to bring a model vehicle having the brake assembly to a stop.

5. A brake comprising:

a shaft having a cylindrical concentric bore extending through at lease a portion of the shaft along a rotation axis of rotation, the bore defined by an inner surface of the shaft;

a cylindrical rod having an axis of rotation and an outer surface, the rod dimensioned to loosely fit within the bore for rotating the shaft about the shaft central rotation axis, the shaft central rotation axis coaxial with the rod rotation axis, the rod having a continuous groove within the outer surface about a periphery of the rod, the groove dimensioned for receiving an O-ring, the groove defined by side walls and a bottom wall;

a flexible O-ring having side surfaces for contacting the groove side walls thereby forming a chamber with the bottom wall, the O-ring having an outside surface dimensioned for forming a gap with the shaft inner surface in a first position wherein the shaft freely rotates about the shaft central axis, the shaft inner surface rotating about the rod outer surface, the O-ring sufficiently flexible for expanding from the first position to a second position for making frictional contact with the shaft inside surface; and means for delivering fluid to within the chamber sufficient thereby expanding the O-ring to a second position wherein the O-ring outside surface makes frictional contact with the shaft inside surface with sufficient force for restricting rotation of the shaft about the rod; the delivery means communicating between the chamber and a pressurized fluid source.

6. The brake as recited in claim 5, wherein the groove is further defined having generally parallel side walls with each side wall generally perpendicular to the bottom wall.

7. The brake as recited in claim 5, wherein the fluid delivery means comprises a conduit delivering the fluid from the source to an input port penetrating a groove wall portion defining the chamber.

8. A wheel brake assembly comprising:

an axle member having an axis of rotation and a cylindrical perimeter portion, the perimeter portion having a groove extending around the portion, the groove defined by a bottom wall and side walls dimensioned for receiving an O-ring;

a flexible O-ring extending around the perimeter, the O-ring having sides in contact with the side walls of the groove for forming a seal at the groove side walls, the O-ring and the groove bottom wall forming a sealed chamber with portions of the side walls;

a rotatable hub having an interior surface portion defined by a cylindrical bore dimensioned for rotatably receiving the axle member perimeter portion;

means for increasing pressure within the chamber for expanding the O-ring from a first position wherein an outside surface of the ring member is distant from the hub interior surface portion to a second position wherein frictional contact between an outside surface of the ring member with the hub interior surface portion exists, the frictional contact sufficient for limiting hub rotation.

9. The brake assembly as recited in claim 8, wherein the O-ring has a cross-section including at least one flat surface portion.

10. The brake assembly as recited in claim 8, wherein the pressure means further comprises means for providing regulated air pressure to the chamber, the air pressure sufficient for increasing pressure within the chamber to cause expansion of the O-ring against the hub interior surface portion for braking any rotation of the hub.

11. The brake assembly as recited in claim 10, further comprising a flanged wall pair affixed to a peripheral portion of a hub perimeter, the wall pair dimensioned for receiving a model vehicle tire within the flanged wall pair.

12. The brake assembly as recited in claim 8, wherein the pressure means comprises:

a compressed air source;

a conduit affixed between the compressed air source and the chamber; and a control valve communicating with the conduit for controlling an amount of air released from the source into the chamber.

13. A method for braking a rolling vehicle such as a model aircraft or mode automobile, the braking method comprising the steps of:

providing a wheel hub having an inner wall portion dimensioned for communicating with an axle member, the hub having an outside rim portion for receiving a model vehicle tire;

affixing a tire to the outside rim portion;

providing an axle member having parallel flange elements forming a channel for receiving a flexible O-ring, the channel having inside wall surfaces for sealable contacting the O-ring, the flange elements loosely rotatable within the wheel hub inner wall portion, the axle member having a bore for receiving an axle;

affixing the axle member to the axle, the axle communicating with a vehicle for permitting the vehicle to roll over a desired surface;

providing a flexible O-ring having side surfaces for sealably contacting channel side walls;

placing the O-ring within the channel, the O-ring side surfaces sealably contacting the channel side walls, the O-ring having an inner surface spaced from the channel bottom wall thereby forming a chamber with a bottom portion of the channel and the O-ring inner surface;

providing a conduit for communicating with the chamber; and injecting air into the chamber through the conduit for increasing pressure within the chamber, the increasing pressure causing the flexible O-ring to expand from a first position out of contact with the hub inner wall portion to a second position making frictional contact with the hub inner wall portion for restricting rotation of the hub and thus movement of the vehicle.

14. The braking method as recited in claim 13, further comprising the steps of:

providing a pressurized air supply sufficient to expand the ring member;

providing a control valve for regulating amount of air supplied to the chamber; and regulating the air provided to the chamber to bring the vehicle from a full rolling motion through a deceleration motion and on to a full stop.

15. A method for braking a rotating shaft comprising the steps of:

provamiding a shaft having an inside surface defined by a bore extending axially into at least a portion of the shaft;

providing a rod dimensioned for fitting within the bore, the rod having a continuous groove within a perimeter surface of the rod, the groove dimensioned for receiving a O-ring, the groove defined by side walls and a bottom wall;

providing a O-ring dimensioned to closely fit within the groove, the O-ring having side surfaces dimensioned for sealably contacting the groove side walls, an inside surface distant from the groove bottom wall and an outside surface distant from the shaft inside surface;

placing the O-ring within the groove, the O-ring inside surface forming a chamber with the groove side and bottom walls;

placing the rod within the bore;

rotating the shaft;

increasing pressure within the chamber thereby expanding the O-ring from a first position wherein the O-ring from a first position wherein the O-ring outside surface is out of contact with the shaft inner surface to a second position wherein frictional contact is made with the shaft inside surface; and continuing to increase pressure for providing sufficient frictional force between the shaft inner surface and the O-ring outside surface to bring the rotating shaft to a stop.

16. The braking method as recited in claim 15, wherein the increasing pressure step further comprises the steps of:

providing a compressed air source;

providing a conduit from the compressed air source to the chamber;

providing a control valve communicating within the conduit; and regulating air flow into the chamber.

* * * * *